United States Patent Office 3,321,464
Patented May 23, 1967

3,321,464
3-CARBO HYDROCARBONOXY AMINO CROTONAMIDES AND PROCESS FOR THE PREPARATION OF URACILS THEREFROM
Edward J. Soboczenski, Chadds Ford, Pa., assignor to E. I. du Pont de Nemours and Company, Wilmington, Del., a corporation of Delaware
No Drawing. Filed July 22, 1965, Ser. No. 474,137
3 Claims. (Cl. 260—239)

This invention relates to a novel process for the preparation of 3-substituted-6-methyluracils. It is more particularly directed to a process whereby these uracils are prepared from a substituted acetoacetamide and a carbamate.

This application is a continuation-in-part of my copending application Ser. No. 120,903, filed June 30, 1961, now abandoned.

The uracil compounds prepared according to this invention are of the formula

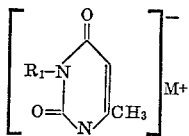

where:

$R_1$ is alkyl of 3–8 carbon atoms,
Phenyl,
Substituted phenyl wherein said substituent is selected from the group consisting of alkyl of 1–4 carbon atoms, monohalo or dihalo, the term "halo" including chloro, bromo, fluoro, and iodo,
Benzyl,
Substituted benzyl wherein said substituent is selected from the group consisting of monohalo or dihalo, the term "halo" including chloro, bromo, fluoro, and iodo,
Cycloalkyl of 3–12 carbon atoms,
Substituted cycloalkyl of 3–12 carbon atoms wherein said substituent is selected from the group consisting of alkyl and methoxy,
Cycloalkenyl of 4–12 carbon atoms,
Cycloalkyl alkyl of 4–13 carbon atoms,
(Substituted cycloalkyl) alkyl of 4–13 carbon atoms wherein said substituent is selected from the group consisting of alkyl and methoxy,
Cycloalkenyl alkyl of 5–13 carbon atoms,
1-azepinyl,
4-morpholino,
1-piperidino,
2-methylpiperidino, and
2,5-dimethylmorpholino; and
M is hydrogen, sodium, or potassium.

These uracils are useful as herbicides. They can, at concentrations of from 1% to 95%, be formulated with agricultural adjuvants and diluents to give highly effective herbicidal compositions. Suitable adjuvants, methods for formulating these uracils with them, and methods for their application to plants are disclosed in copending applications Ser. No. 290,611, filed June 26, 1963, and Ser. No. 233,952, filed Oct. 29, 1962.

By using the process of this invention, it is possible to prepare the uracils in one reaction vessel, using starting materials which are pure and easily obtained. Yields of the uracil product are high.

The process of this invention proceeds according to the following equations:

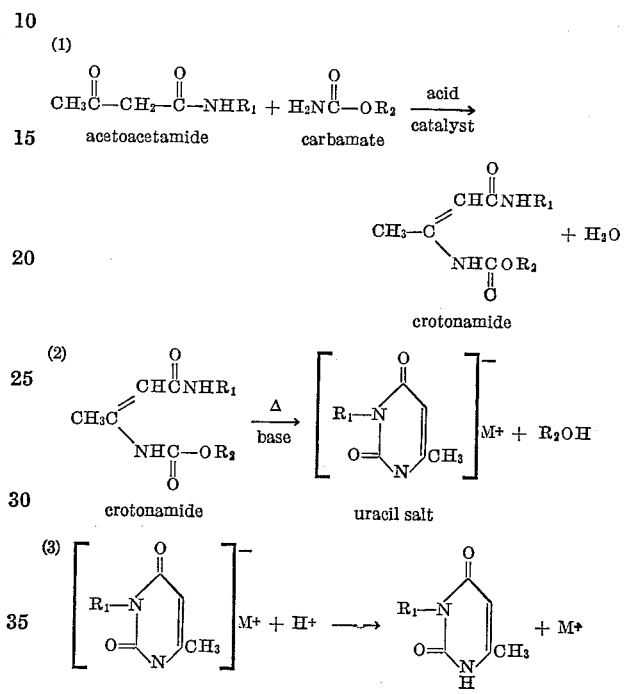

In these equations, $R_1$ is a monovalent organic radical as defined above. $R_2$ is an alkyl group containing from 1 to 6 carbon atoms or an aryl radical containing from 6 to 2 carbon atoms. The reactants and reaction products of the working examples set forth hereinafter are clearly representative of radicals included within the definition of these terms, $R_1$ and $R_2$.

The intermediate crotonamide obtained in the reaction of Equation 1 is a novel compound and can be isolated at this stage. The compound is useful in eradicating growths of mustard.

REACTION CONDITIONS FOR STEP 1

The reactants in this step are an N-substituted acetoacetamide and an alkyl or aryl carbamate. Alkyl carbamates can be introduced into the reaction in the form of "Liquithane," which is a eutectic mixture of methyl carbamate and ethyl carbamate manufactured by the Berkeley Chemical Corporation, Berkeley Heights, N.J.

A mixture of N-substituted acetoacetamide, catalyst, and an alkyl or aryl carbamate is stirred and distilled to remove evolved water, thereby forming a 3-hydrocarbyloxycarbonylamino-N-substituted crotonamide. The use of an inert liquid medium for this reaction is preferable but optional. For maximum yields of the crotonamide, the reaction temperature should be kept low and water should be removed as rapidly as possible.

The order of addition of the reactants to the reaction vessel is not critical. When using an inert liquid medium, the reactants and the catalyst can be added to the vessel containing the inert liquid medium at ambient temperature, and the mixture then heated. Alternatively, the reactants can be added to the inert liquid medium, the mixture heated and the catalyst then added.

In order to obtain maximum theoretical conversion, the mole ratio of the N-substituted acetoacetamide to the alkyl or aryl carbamate should be about 1 to 1. In practice, the acetoacetamide/carbamate mole ratio can vary widely. A mole ratio of from 0.7 to 1.30 moles of acetoacetamide for each mole of carbamate is preferred.

The reaction is facilitated if it is carried out in an inert liquid medium. With good agitation, the liquid prevents localized heating and permits more rapid removal of water from the reaction zone. This liquid should be a substance which does not react with the reagents or products involved in the entire process under the described reaction conditions, and preferably boils in the temperature range of 60° C. to 160° C. at pressures of 25–1500 mm. of mercury. Inert liquids which can be used for this reaction include, but are not limited to, cyclohexane, hexane, heptane, octane, chloroform, o-dichlorobenzene, benzene, toluene, xylene, chlorobenzene, diisobutylene, or mixtures of these liquids with a water-miscible liquid such as dioxane. Xylene is preferred. Preferably about 0.1 to 5 parts by weight of the inert liquid are used for each part of the reactants. The use of a large excess of the liquid medium should be avoided since it dilutes the reactants and hinders the removal of water from the reaction zone.

When the reaction is carried on without an inert liquid medium, the reaction temperatures are maintained in the range of 70° C. to 150° C. until approximately the theoretical amount of water is collected by distillation. The removal of water under these conditions is facilitated by operating at reduced pressure. Pressures of from 25–300 mm. are preferred.

When using an inert liquid medium, the reaction should be run at a temperature of 60–160° C., and the pressure should be adjusted so that the medium boils at the reaction temperature. The water given off by the reaction is then removed by azeotropic distillation as rapidly as possible. The reaction is generally heated for from 1 to 15 hours or until water ceases to be evolved from the reaction. The reaction time will, of necessity, depend upon many variables, such as temperature, pressure, reactants, catalyst, and the rate at which the solvent is distilled.

For maximum yield of product it is desirable to rapidly remove the water which is formed and to avoid high temperatures. The resulting short reaction times at moderate temperatures minimize decomposition of reactants or of the unsaturated amide intermediate.

For initiation of the reaction and its successful operation, it is necessary to have a catalyst present. This catalyst can be any acid having an ionization constant greater than $2 \times 10^{-5}$. It can be a hydrogen acid, an amine salt of a hydrogen acid or an ammonium sulfonate. Illustrative of these acid catalysts are methanesulfonic, ethanesulfonic, benzenesulfonic, toluenesulfonic, xylenesulfonic, ethylphosphonic, hexylphosphonic, benzenephosphonic, formic, monochloroacetic, hydrochloric, hydrobromic, phosphoric, sulfuric, and polyphosphoric. Sodium bisulfate, ammonium p-toluenesulfonate and ammonium bromide can also be used. Preferred acid catalysts for this step are sulfuric, p-toluenesulfonic, phosphoric, and monochloroacetic.

The amount of catalyst to be used naturally varies with the reactants. Generally, however, a .001 to a .2 mole ratio of acid catalyst to acetoacetamide reactant is sufficient.

The course and completion of the reaction can be judged by measuring the weight or volume of the water collected; the number of moles of water should be approximately equal to the smaller number of moles of either starting reactant.

The reaction residue is a mixture of a novel crotonamide intermediate, acid catalyst, inert liquid medium, and unreacted starting materials. The novel crotonamide intermediate can be isolated by separating or neutralizing the acid catalyst, distilling off the inert medium, slurrying the residue in water, filtering off the solid, and then recrystallizing it from a solvent such as acetonitrile, carbon tetrachloride or cyclohexane.

If desired, the reaction residue can be used directly without further processing as the starting material for reaction 2.

Another alternative is to cool the reaction residue to ambient temperature, preferably neutralize the catalyst and wash the solution with water. The water will dissolve out unwanted salts, starting materials and leave the crotonamide in the inert liquid. After separation, the traces of water which remain in the inert liquid can be removed by azeotropic distillation and the solution is ready for reaction 2.

REACTION CONDITIONS FOR STEP 2

The reaction mixture from Step 1, containing the crotonamide intermediate, acid catalyst, unreacted starting materials, and inert liquid medium is used as the starting material for this reaction. The mixture need not be removed from the reaction (1) vessel, although filtration or decantation from any remaining insoluble starting material or catalyst may sometimes be desirable.

If the crotonamide intermediate has been isolated, it must first be diluted with an inert liquid such as methanol, ethanol, propanol, isopropanol, benzene, toluene, water, dioxane, or mixtures of these. Nonaqueous liquids are preferred.

The mixture containing the crotonamide intermediate, whether removed or not removed from the original reaction vessel, is then heated at reflux temperatures of from 55–155° with a 0 to 300% excess of a strong base such as sodium hydroxide, potassium hydroxide, or a sodium alkoxide such as sodium methoxide or sodium ethoxide. Sodium methoxide and ethoxide are preferred. These may be added as solids to the solution or suspension containing the crotonamide intermediate, or they may first be dissolved or slurried in a solvent such as methanol, ethanol, isopropanol or mixtures of these and then added.

Heating is continued at reflux temperature for from 5 minutes to 5½ hours. The time required for the reaction to be completed will naturally depend on the reactants, the reaction medium, temperatures, pressures, and the like.

Ring closure occurs rapidly at reflux temperature. Low boiling alcohols resulting from the condensation reaction may be removed by distillation, leaving the higher boiling inert liquid as the reaction medium. The uracil salt either separates as a precipitate which can be filtered off from the reaction medium, or remains as a residue when the inert medium is distilled off.

The uracil salt obtained as a product of this reaction may be formulated directly into herbicidal compositions. A purer uracil salt is obtained if the uracil salt-inert liquid medium mixture is extracted with water, the inert liquid medium separated, and the aqueous solution concentrated to dryness to recover the uracil salt.

REACTION CONDITIONS FOR STEP 3

The acidic form of the uracil compound may be obtained by diluting the reaction residue with 1 to 15 volumes of water and then stirring to dissolve the salts. The pH of the water layer is then reduced to 2–7 with an acid such as hydrochloric or sulfuric. The uracil itself precipitates from the aqueous solution as a solid material which can be filtered off, washed with water and dried. A purer product is obtained if the basic aqueous uracil salt solution is washed free of basic and neutral impurities by extraction with a water immiscible solvent such as benzene, xylene, or ether prior to acidification. Alternatively, the aqueous uracil salt solution which has been separated from the inert liquid medium (as described above) may be acidified in the same fashion with like results.

from the benzene layer and neutralized to pH 6 at 15–17° C. by the addition of 69.5 parts by weight of concentrated hydrochloric acid. The solid white 3-isopropyl-6-methyluracil which precipitates is washed with 50 parts by weight of water and dried. The compound has a melting point of 182–185° C.

The uracils listed in the following table can be prepared in a similar manner by substituting the listed reactants and catalysts, in their respective proportions, for the reactants and catalyst used in this example.

| Acetoacetamide | Pts. by Wt. | Carbamate | Pts. by Wt. | Acid Catalyst | Pts. by Wt. | Crotonamide | 6-methyluracil |
|---|---|---|---|---|---|---|---|
| N-sec-butyl | 78.5 | Methyl | 45 | Methanesulfonic | 2.4 | 3-(methoxycarbonylamino)-N-sec-butyl. | 3-sec-butyl. |
| N-cyclohexyl | 91.5 | do | 45 | Phosphoric | 7.5 | 3-(methoxycarbonylamino)-N-cyclohexyl. | 3-cyclohexyl. |
| N-3-chlorophenyl | 324.0 | do | 225 | p-toluenesulfonic | 17.2 | 3-(methoxycarbonylamino)-N-3-chlorophenyl. | 3-(α-chlorophenyl). |
| N-α-methylbenzyl | 410.0 | do | 225 | do | 17.2 | 3-(methoxycarbonylamino)-N-α-methlbenzyl. | 3-(α-methylbenzyl). |
| N-3,4-dichlorophenyl | 492.0 | do | 225 | do | 17.2 | 3-(methoxycarbonylamino)-N-3,4-dichlorophenyl. | 3-(3,4-dichlorophenyl). |
| N-3-nitrophenyl | 444.0 | do | 225 | do | 17.2 | 3-(methoxycarbonylamino)-N-3-nitrophenyl. | 3-(3-nitrophenyl). |
| N-4-chlorophenyl | 324.0 | do | 225 | do | 17.2 | 3-(methoxycarbonylamino)-N-4-chlorophenyl. | 3-(4-chlorophenyl). |
| N-tert-butyl acetoacetamide | 78.5 | do | 45 | do | 8.6 | 3-(methoxycarbonylamino)-N-tert butyl. | 3-tert-butyl. |
| N-(3-pentyl)acetoacetamide | 85.5 | do | 45 | do | 8.6 | 3-(methoxycarbonylamino)-N-3-pentyl. | 3-(3-pentyl). |
| N-norbornyl acetoacetamide | 195.0 | Ethyl | 108 | Sulfuric | 15.0 | 3-(ethoxycarbonylamino)-N-norbornyl. | 3-norbornyl. |
| N-norbornylmethyl acetoacetamide. | 209.0 | Butyl | 140 | do | 15.0 | 3-(butoxycarbonylamino)-N-norbornylmethyl. | 3-norbornylmethyl. |
| N-cyclohexylmethyl | 196.0 | Propyl | 124 | p-toluenesulfonic | 8.6 | 3-(propoxycarbonylamino)-N-cyclohexyl. | 3-cyclohexylmethyl. |
| N-2-cycloocten-1-yl | 207.0 | Methyl | 90 | do | 8.6 | 3-(methoxycarbonylamino)-N-2-cycloocten-1-yl). | 3-(2-cycloocten-1-yl). |
| N-iden-5-yl | 220.0 | do | 90 | do | 8.6 | 3-(methoxycarbonylamino)-N-inden-5-yl. | 3-(inden-5-yl). |
| N-cyclopentenyl | 84.0 | Amyl | 79.0 | Methane sulfonic | 4.8 | 3-(amyloxycarbonylamino)-N-cyclopentenyl. | 3-cyclopentenyl. |
| N-indanyl | 220 | Ethyl | 108 | do | 4.8 | 3-(ethoxycarbonylamino)-N-indanyl. | 3-indanyl. |
| N-norbornenyl methyl | 207.0 | Hexyl | 86.0 | p-toluenesulfonic | 8.6 | 3-(hexyloxycarbonylamino)-N-norbornenylmethyl. | 3-norbornenylmethyl. |
| N-cyclohexenyl methyl | 194 | Ethyl | 108 | do | 8.6 | 3-(ethoxycarbonylamino)-N-cyclohexenylmethyl. | 3-(cyclohexenylmethyl). |
| N-(3-methylcyclohexyl) | 196 | Isopropyl | 124 | do | 8.6 | 3-(isopropoxycarbonyl amino)-N-(3-methylcyclohexyl). | 3-(3-methylcyclohexyl). |
| N-(p-methoxycyclohexyl) | 212 | Methyl | 90 | Sulfuric | 7.0 | 3-(methoxycarbonylamino)-N-(p-methoxycyclohexyl). | 3-(p-methoxycyclohexyl). |

The uracil so obtained is sufficiently pure for use in preparing herbicidal formulations. It may, however, be recrystallized from solvents such as ethanol, acetonitrile or nitromethane if desired.

This invention will be more readily understood by referring to the following illustrative examples:

*Example 1.—Preparation of 3-isopropyl-6-methyluracil*

A slurry containing 71.5 parts by weight of N-isopropylacetoacetamide, 67 parts by weight of ethyl carbamate, 0.5 part by weight of p-toluenesulfonic acid, and 440 parts by weight of benzene is stirred and heated to reflux temperature. The water given off by the reaction is rapidly and continuously distilled out, condensed, and collected in a suitable trap. The benzene which comes off with the water is returned to the reaction vessel. After 23 hours of refluxing, 8.8 parts by weight of water are collected.

The reaction mixture is cooled to room temperature, washed twice with 200 parts by weight of water, returned to the reaction vessel, and refluxed for a short time to remove traces of dissolved or entrained water.

To this reaction mixture of 3-ethoxy-carbonylamino-N-isopropylcrotonamide in benzene are added 44 parts by weight of sodium methoxide. The slurry is refluxed with stirring for 90 minutes, and then cooled to 35° C. Six hundred parts by weight of water are added, with shaking, to dissolve the salt. The water layer is then separated

*Example 2.—Preparation of 3-cyclohexyl-6-methyluracil*

A mixture of 366 parts by weight of N-cyclohexylacetoacetamide, 279 parts by weight of ethyl carbamate, 2900 parts by weight of xylene, and 25 parts by weight of 85% phosphoric acid is stirred and heated to reflux temperature. Water given off by the reaction is continuously distilled out, condensed, and collected in a suitable trap. The xylene which comes off with the water is separated and returned to the reaction vessel. Evolution of water stops after 15 hours.

This reaction solution is separated from the catalyst by decantation and transferred to a clean vessel. A total of 270 parts by weight of sodium methoxide is then added and the mixture stirred and slowly heated to reflux temperature. The mixture is refluxed for about 1½ hours. A gummy material forms which is gradually transformed into a granular solid. This solid is filtered off, washed with acetonitrile, and dried.

This solid is then dissolved in about 4000 parts by weight of water and acidified to pH 2 with concentrated hydrochloric acid, whereupon 3-cyclohexyl-6-methyluracil precipitates. This compound is filtered off and dried. It has a melting point of 225–229° C.

The uracils listed in the following table can be similarly prepared by substituting the listed reactants and catalysts, in their respective proportions, for the reactants and catalyst used in this example.

| Acetoacetamide | Pts. by Wt. | Carbamate | Pts. by Wt. | Acid Catalyst | Pts. by Wt. | Crotonamide | 6-methyluracil |
|---|---|---|---|---|---|---|---|
| N-n-pentyl | 342 | Ethyl | 267 | Xylenesulfonic | 18.6 | 3-(ethoxycarbonylamino)-N-n-pentyl. | 3-(n-pentyl). |
| N-(2-methylbutyl) | 342 | Liquithane | 246 | Ethanesulfonic | 11.0 | (1) | 3-(2-methylbutyl). |
| N-(1,3-dimethylbutyl) | 370 | do | 246 | Benzenephosphonic. | 15.4 | (2) | 3-[1(1,3-dimethylbutyl)]. |
| N-(o-chlorophenyl) | 423 | do | 246 | p-toluenesulfonic | 17.2 | (3) | 3-(o-chlorophenyl). |
| N-(hexahydro-1-azepinyl) | 198 | Methyl | 90 | do | 8.6 | 3-(methoxycarbonylamino)-N-hexahydro-1-azepinyl. | 3-(hexahydro-1-azepinyl). |
| N-(4-morpholino) | 186 | do | 90 | do | 8.6 | 3-(methoxycarbonylamino)-N-(4-morpholino). | 3-(4-morpholino). |
| N-(1-piperidino) | 184 | do | 90 | do | 8.6 | 3-(methoxycarbonylamino)-N-(1-piperidino). | 3-(1-piperidino). |
| N-(1-pyrrolidinyl) | 170 | do | 90 | do | 8.6 | 3-(methoxycarbonylamino)-N-(1-pyrrolidinyl). | 3-(1-pyrrolidinyl). |
| N-(2-methylpiperidino) | 184 | Ethyl | 108 | do | 8.6 | 3-(ethoxycarbonylamino)-N-(2-methylpiperidino). | 3-(2-methylpiperidino). |
| N-(2,5-dimethylmorpholino) | 210 | do | 108 | do | 8.6 | 3-(ethoxycarbonylamino)-N-(2,5-dimethylmorpholino). | 3-(2,5-dimethylmorpholino). |
| N-(m-bromophenyl) | 256 | do | 108 | do | 17.0 | 3-(ethoxycarbonylamino)-N-(m-bromophenyl). | 3-(m-bromophenyl). |
| N-cyclopropyl | 141 | do | 108 | do | 8.6 | 3-(ethoxycarbonylamino)-N-cyclopropyl. | 3-(cyclopropyl). |
| N-(o-fluorophenyl) | 195 | Methyl | 90 | do | 17.0 | 3-(methoxycarbonylamino)-N-o-fluorophenyl. | 3-(o-fluorophenyl). |
| N-(cyclopropylmethyl) | 155 | do | 90 | Phosphoric | 15.0 | 3-(methoxycarbonylamino)-N-cyclopropylmethyl. | 3-(cyclopropylmethyl). |

[1] Mixture of 3-(methoxycarbonylamino)-N-(2-methylbutyl) and 3-(ethoxycarbonylamino)-N-(2-methylbutyl).
[2] Mixture of 3-(methoxycarbonylamino)-N-(1,3-dimethylbutyl) and 3-(ethoxycarbonylamino)-N-(1,3-dimethylbutyl).
[3] Mixture of 3-(methoxycarbonylamino)-N-(o-chlorophenyl) and 3-(ethoxycarbonylamino)-N-(o-chlorophenyl).

*Example 3.—Preparation of 3-sec-butyl-6-methyluracil*

One hundred fifty-seven parts by weight of N-sec.-butyl acetoacetamide, 93.8 parts by weight of methylcarbamate, 215 parts by weight of xylene, and 9.3 parts by weight of xylene sulfonic acid are placed into a vessel fitted with a stirrer, heater, and a condenser having a water trap.

The pressure is reduced to about 112 millimeters of mercury and the mixture is refluxed at about 82° C. until water no longer evolves.

The vacuum is then released and 75.5 parts of sodium methoxide are added. This mixture is stirred and heated at reflux temperature for about 1½ hours. It is then cooled to about 10° C., diluted with 400 parts of water, agitated, and the aqueous layer is then separated and gradually acidified to pH 6.5–7 with 12% aqueous hydrochloric acid at 8–12° C., whereupon essentially pure 3-sec. butyl-6-methyluracil precipitates.

*Example 4.—Preparation of 3-(2-methylphenyl)-6-methyluracil*

A mixture of 191.2 parts of o-acetoacetotoluidide, 684 parts of benzene, and 2 parts of p-toluenesulfonic acid is stirred and heated to reflux temperature. Traces of water present in the reactants are removed by azeotropic distillation and collected in a suitable trap. One hundred parts of "Liquithane" are then added.

This mixture is refluxed for 18 hours and the water evolved is distilled out and collected. The reaction solution is then cooled and washed with water. The water is removed and the solution is dried and concentrated to a solid consisting of a mixture of 3-ethoxycarbonylamino-N-(2-methylphenyl)crotonamide and 3-methoxycarbonylamino-N-(2-methylphenyl)crotonamide.

This solid is converted to the corresponding uracil by refluxing it for ¾ hour with a mixture of 635 parts of absolute ethyl alcohol and 70 parts of sodium methoxide. The solvent is then distilled off under reduced pressure and the residue is taken up in water.

Neutral impurities are removed from this basic aqueous mixture by extracting them with ether. The aqueous layer is then acidified with hydrochloric acid to pH 6 and the solid 3-(2-methylphenyl)-6-methyluracil which precipitates is dried and recrystallized from isopropanol. It has a melting point of 246.5–249° C.

*Example 5*

A mixture of 189.5 parts by weight of N-cyclohexyl acetoacetamide, 139.5 parts by weight of ethyl carbamate, 440 parts by weight of benzene, 520 parts by weight of p-dioxane and 15 parts by weight of 85% phosphoric acid is stirred at reflux. The water given off by the reaction is continuously distilled out, condensed and collected in a suitable trap.

After the mixture has refluxed for about 20 hours, the clear yellow solution is decanted from the acid catalyst and concentrated to dryness under reduced pressure. The resulting white solid is slurried with cold water, filtered, recrystallized from about 685 parts by weight of acetonitrile, filtered and dried to give 3-ethoxycarbonylamino-N-cyclohexylcrotonamide, melting point 156–159° C.

A mixture of 2 parts by weight of this 3-ethoxycarbonylamino-N-cyclohexylcrotonamide, 1 part by weight of sodium methoxide and 7.8 parts by weight of absolute ethanol is refluxed for 5½ hours. It is then poured into 10 parts by weight of water and acidified with hydrochloric acid. The solid white 3-cyclohexyl-6-methyluracil which precipitates is filtered and dried, melting point 230–232° C.

Other crotonamides and uracils can be prepared in this fashion by replacing the reactants and catalyst in this example with the proper amounts of those listed in the following table.

| N-Substituted Acetoacetamide | Pts. by Wt. | Substituted Carbamate | Pts. by Wt. | Acid Catalyst | Pts. by Wt. | Substituted Crotonamide | 3-Substituted-6-Methyluracil |
|---|---|---|---|---|---|---|---|
| N-isopropyl acetoacetamide | 143 | Methyl | 90 | p-toluenesulfonic | 8.5 | 3-(methoxycarbonylamino)-N-isopropyl crotonamide. | 3-isopropyl. |
| Do | 143 | Phenyl | 151 | Methanesulfonic | 4.8 | 3-(phenoxycarbonylamino)-N-isopropyl crotonamide. | Do. |
| Do | 143 | Tolyl | 166 | Phosphoric | 15 | 3-(tolyloxycarbonylamino)-N-isopropyl crotonamide. | Do. |
| N-n-butyl acetoacetamide | 157 | Methyl | 90 | do | 15 | 3-(methoxycarbonylamino)-N-n-butyl crotonamide. | 3-n-butyl. |
| N-sec-butyl acetoacetamide | 157 | do | 90 | p-toluenesulfonic | 8.6 | 3-(methoxycarbonylamino)-N-sec-butyl crotonamide. | 3-sec-butyl. |
| Do | 157 | Xylyl | 182 | do | 8.6 | 3-(xylylcarbonylamino)-N-sec-butyl crotonamide. | Do. |
| N-2-pentyl acetoacetamide | 171 | Methyl | 90 | Phosphoric | 15 | 3-(methoxycarbonylamino)-N-2-pentylcrotonamide. | 3-(2-pentyl). |
| N-2-(3-methyl butyl)acetoacetamide. | 171 | Ethyl | 108 | do | 15 | 3-(ethoxycarbonylamino)-N-2-(3-methylbutyl)crotonamide. | 3(3-methylbutyl). |
| N-n-hexyl acetoacetamide | 185 | do | 108 | do | 15 | 3-(ethoxycarbonylamino)-N-n-hexylcrotonamide. | 3-n-hexyl. |
| N-2-hexyl acetoacetamide | 185 | do | 108 | Benzenesulfonic | 7.9 | 3-(ethoxycarbonylamino)-N-2-hexylcrotonamide. | 3-(2-hexyl). |
| N-2-(2-methylpentyl)acetoacetamide. | 185 | do | 108 | do | 7.9 | 3-(ethoxycarbonylamino)-N-2-(2-methylpentyl)crotonamide. | 3-(2-methylpentyl). |
| N-cyclopentyl acetoacetamide. | 169 | do | 108 | do | 7.9 | 3-(ethoxycarbonylamino)-N-cyclopentylcrotonamide. | 3-cyclopentyl. |
| N-cyclohexyl acetoacetamide | 183 | Methyl | 90 | p-toluenesulfonic | 8.6 | 3-(methoxycarbonylamino)-N-cyclohexylcrotonamide. | 3-cyclohexyl. |
| Do | 183 | Phenyl | 151 | Dichloroacetic | 6.5 | 3-(phenoxycarbonylamino)-N-cyclohexylcrotonamide. | Do. |
| N-cyclohexyl acetoacetamide | 183 | p-chlorophenyl. | 189 | do | 6.5 | 3-(p-chlorophenoxycarbonylamino)-N-cyclohexyl-crotonamide. | Do. |
| N-cycloheptyl acetoacetamide | 197 | Methyl | 90 | Diethylphosphonic. | 7.7 | 3-(methoxycarbonylamino)-N-cycloheptylcrotonamide. | 3-cycloheptyl. |
| N-cyclooctyl acetoacetamide | 211 | do | 90 | do | 7.7 | 3-(methoxycarbonylamino)-N-cyclooctylcrotonamide. | 3-cyclooctyl. |
| N-phenyl acetoacetamide | 177 | do | 90 | p-toluene sulfonic | 8.6 | 3-(methoxycarbonylamino) crotonanilide. | 3-phenyl. |
| N-(4-methylphenyl)acetoacetamide. | 191 | do | 90 | do | 8.6 | 3-(methoxycarbonylamino)-p-crotontoluidide. | 3(4-methylphenyl). |
| N-(2-methoxyphenyl)acetoacetamide. | 207 | do | 90 | do | 8.6 | 3-(methoxycarbonylamino) 2'-methoxycrotonanilide. | 3(2-methoxyphenyl). |
| N-(3,4-dichlorophenyl)acetoacetamide. | 246 | do | 90 | Hexyl phosphonic | 8.2 | 3-(methoxycarbonylamino)-3',4'-dichlorocrotonanilide. | 3(3,4-dichlorophenyl). |
| N-(3,4-dimethylphenyl)acetoacetamide. | 205 | do | 90 | Xylene sulfonic | 9.3 | 3-(methoxycarbonylamino)-3',4'-crotonxylidide. | 3(3,4-dimethylphenyl). |
| N-benzyl acetoacetamide | 191 | do | 90 | do | 9.3 | 3-(methoxycarbonylamino)-N-benzylcrotonamide. | 3-benzyl. |
| N-(2-chlorobenzyl)acetoacetamide. | 225.5 | do | 90 | do | 9.3 | 3-(methoxycarbonylamino)-N-2-chlorobenzylcrotonamide. | 3(2-chlorobenzyl). |
| N-β-phenethyl acetoacetamide. | 205 | do | 90 | do | 9.3 | 3-(methoxycarbonylamino)-N-phenethylcrotonamide. | 3-phenethyl. |
| N-(decahydro-1,4,5,8-dimethanonaphth-2-yl). | 253 | do | 90 | p-toluenesulfonic | 17.0 | 3-(methoxycarbonylamino)-N-(decahydro-1,4-5,8-dimethanonaphth-2-yl). | 3-(decahydro-1,4,5,8-dimethanonaphth-2-yl). |
| N-cyclobutenyl | 139 | do | 90 | do | 8.5 | 3-(methoxycarbonylamino)-N-cyclobutenyl). | 3-(cyclobutenyl). |
| N-(β-hydro-1,4,5,8-dimethanonaphth-2-yl). | 251 | do | 90 | do | 8.5 | 3-(methoxycarbonylamino)-N-(B-hydro-1,5,5,8-dimethanonaphth-2-yl). | 3-(β-hydro-1,4,5,8-dimethanonaphth-2-yl). |
| N-(decahydro-1,4,5,8-dimethanonaphth-2-yl-methyl). | 267 | do | 90 | do | 8.5 | 3-(methoxycarbonylamino)-N-decahydro-1,4,5,8-dimethanonaphth-2-yl-methyl). | 3-(decahydro-1,4,5,8-dimethanonaphth-2-yl-methyl). |
| N-cyclobutenyl-methyl | 169 | do | 90 | do | 8.5 | 3-(methoxycarbonylamino)-N-(cyclobutenylmethyl). | 3-(cyclobutenylmethyl). |
| N-fenchyl | 241 | do | 90 | do | 8.5 | 3-(methoxycarbonylamino)-N-fenchyl. | 3-(fenchyl). |
| N-(octahydro-1,4,5,8-dimethanonaphth-2-yl-methyl). | 265 | do | 90 | do | 8.5 | 3-(methoxycarbonylamino)-N-(octahydro-1,4-5,8-dimethanonaphth-2-yl-methyl). | 3-(octahydro-1,4,5,8-dimethanonaphth-2-yl-methyl). |

The embodiments of the invention in which an exclusive property or privilege is claimed are:
1. A process for the preparation of 3-substituted-6-methyluracils, said process comprising
   (a) reacting a substituted acetoacetamide of the formula

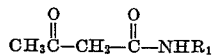

wherein:
   $R_1$ is selected from the group consisting of alkyl of 3–8 carbon atoms,
   phenyl,
   substituted phenyl wherein said substituent is selected from the group consisting of alkyl of 1–4 carbon atoms, monohalo or dihalo,
   benzyl,
   substituted benzyl wherein said substituent is selected from the group consisting of monohalo or dihalo,
   cycloalkyl of 3–12 carbon atoms,
   substituted cycloalkyl of 3–12 carbon atoms wherein said substituent is selected from the group consisting of alkyl or methoxy,
   cycloalkenyl of 4–12 carbon atoms,
   cycloalkyl alkyl of 4–13 carbon atoms, (substituted cycloalkyl) alkyl of 4–13 carbon atoms wherein said substituent is selected from the group consisting of alkyl or methoxy,
cycloalkenyl alkyl of 5–13 carbon atoms,
1-azepinyl,
4-morpholino,
1-piperidino,
2-methylpiperidino, and
2,5-dimethylmorpholino
with a carbamate of the formula

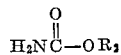

wherein $R_2$ is selected from the group consisting of alkyl of 1–6 carbon atoms and aryl of 6–8 carbon atoms,
in the presence of an acid having an ionization constant greater than $2 \times 10^{-5}$, to form a substituted crotonamide; and (b) heating said crotonamide in the presence of a strong base to give a 3-substituted-6-methyluracil salt.

2. The process of claim 1 wherein the 3-substituted-6-methyluracil salt is additionally dissolved in water and said solution is adjusted to pH 2–7 to give a 3-substituted-6-methyluracil.

3. A compound of the formula

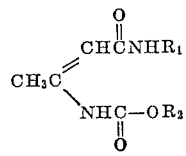

where:
$R_1$ is selected from the group consisting of alkyl of 3–8 carbon atoms,
phenyl,
substituted phenyl wherein said substitutent is selected from the group consisting of alkyl of 1–4 carbon atoms, monohalo or dihalo,
benzyl,
substituted benzyl wherein said substituent is selected from the group consisting of monohalo or dihalo,
cycloalkyl of 3–12 carbon atoms,
substituted cycloalkyl of 3–12 carbon atoms wherein said substituent is selected from the group consisting of alkyl or methoxy,
cycloalkenyl of 4–12 carbon atoms,
cycloalkyl alkyl of 4–13 carbon atoms,
(substituted cycloalkyl) alkyl of 4–13 carbon atoms wherein said substituent is selected from the group consisting of alkyl or methoxy,
cycloalkenyl alkyl of 5–13 carbon atoms,
1-azepinyl,
4-morpholino,
1-piperidino,
2-methylpiperidino, and
2,5-dimethylmorpholino, and
where:
$R_2$ is alkyl of 1–6 carbon atoms and aryl of 6–8 carbon atoms.

No references cited.

ALEX MAZEL, *Primary Examiner.*

J. TOVAR, *Assistant Examiner.*